(12) United States Patent
Luh

(10) Patent No.: US 6,343,808 B1
(45) Date of Patent: Feb. 5, 2002

(54) TRAILER FASTENING DEVICE

(75) Inventor: Tai-Yang Luh, Tai Pen (TW)

(73) Assignee: Lenn Jianq Co., Ltd., Tai Pen (TW)

( * ) Notice: Subject to any disclaimer, the term of this patent is extended or adjusted under 35 U.S.C. 154(b) by 0 days.

(21) Appl. No.: 09/734,934

(22) Filed: Dec. 11, 2000

(51) Int. Cl.$^7$ .......................... B60D 1/173; F16B 21/00
(52) U.S. Cl. ..................................... 280/511; 403/322.2
(58) Field of Search ............................. 280/511, 416.1, 280/491.5; 403/322.2, 348, 349

(56) References Cited

U.S. PATENT DOCUMENTS

| | | | | |
|---|---|---|---|---|
| 4,201,400 A | * | 5/1980 | Hoogenbosch | 280/511 |
| 4,522,421 A | * | 6/1985 | Vance | 280/511 |
| 5,169,168 A | * | 12/1992 | Harry et al. | 280/511 |
| 5,265,343 A | * | 11/1993 | Pascaloff | 403/322.2 |
| 5,860,669 A | * | 1/1999 | Wass et al. | 280/511 |
| 5,860,671 A | * | 1/1999 | Mackeown | 280/511 |
| 6,189,910 B1 | * | 2/2001 | Bartel | 280/511 |
| 6,203,050 B1 | * | 3/2001 | Stech | 280/511 |
| 6,241,271 B1 | * | 6/2001 | Belinky | 280/511 |

* cited by examiner

*Primary Examiner*—Brian L. Johnson
*Assistant Examiner*—Matt Luby
(74) *Attorney, Agent, or Firm*—Alan Kamrath; Rider, Bennett, Egan & Arundel, LLP

(57) ABSTRACT

A trailer fastening device has a fastening shaft, a collar, a spring, and a solid ball. The collar has a center hole, a through hole, and an inner recess hole receiving the spring and the solid ball. The fastening shaft has a middle blocking disk, a lower threaded rod disposed on a bottom of the middle blocking disk, and an upper rod disposed on a top portion of the middle blocking disk. The upper rod has a helical groove, a blind hole formed on an end of the helical groove, and the end of the helical groove being a bevel. The upper rod is inserted in the center hole of the collar. The collar is rotated until the solid ball reaches the blind hole of the upper rod.

1 Claim, 3 Drawing Sheets

TRAILER FASTENING DEVICE

BACKGROUND OF THE INVENTION

The present invention relates to a trailer fastening device. More particularly, the present invention relates to a trailer fastening device which has a spring to position a solid ball in a blind hole stably.

A conventional trailer fastening rod cannot fasten two trailer plates stably. When a road is uneven, the trailer plates will produce noise.

SUMMARY OF THE INVENTION

An object of the present invention is to provide a trailer fastening device which has a spring to position a solid ball in a blind hole stably.

Accordingly, a trailer fastening device comprises a fastening shaft, a collar, a spring, and a solid ball. The collar has a center hole, a through hole, and an inner recess hole receiving the spring and the solid ball. The fastening shaft has a middle blocking disk, a lower threaded rod disposed on a bottom of the middle blocking disk, and an upper rod disposed on a top portion of the middle blocking disk. The upper rod has a helical groove, a blind hole formed on an end of the helical groove, and the end of the helical groove being a bevel. The upper rod is inserted in the center hole of the collar. The collar is rotated until the solid ball reaches the blind hole of the upper rod along the helical groove of the upper rod.

DETAILED DESCRIPTION OF THE INVENTION

Figure 1:
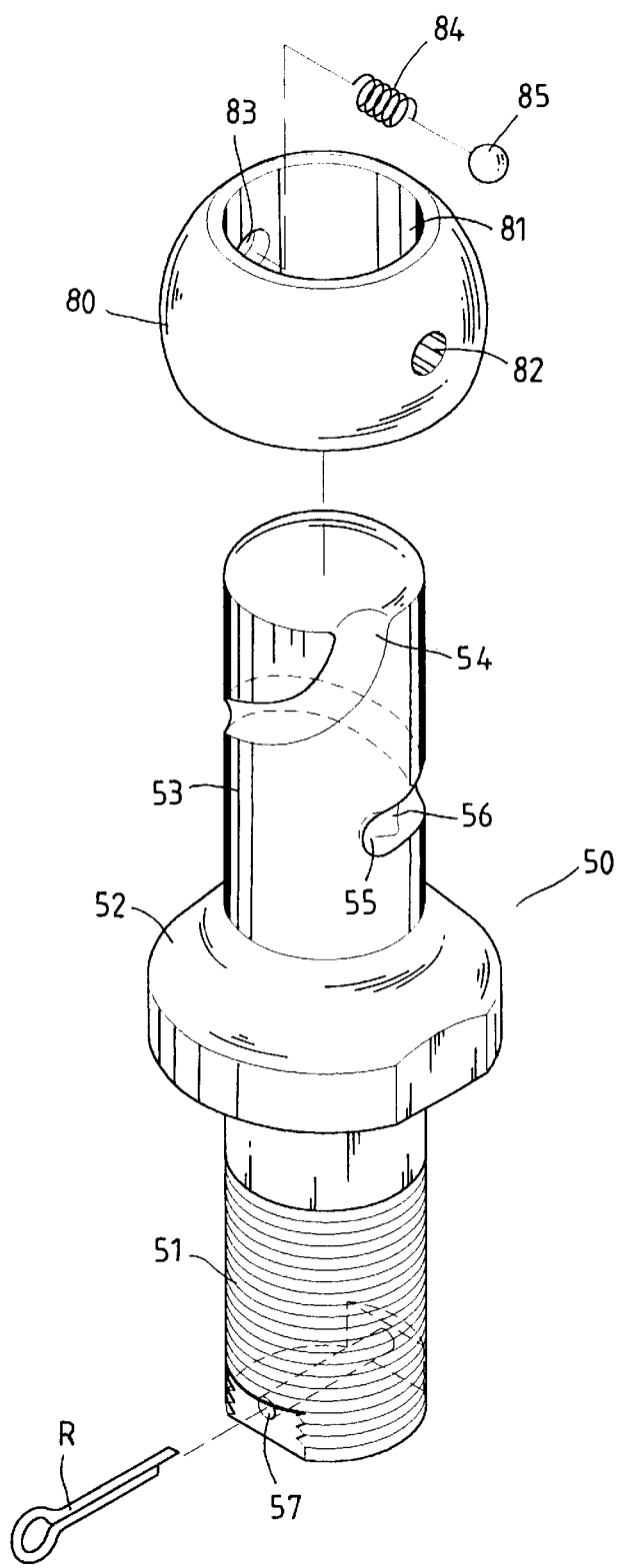
FIG. 1 is a perspective exploded view of a trailer fastening device of a preferred embodiment in accordance with the present invention.
Figure 2:
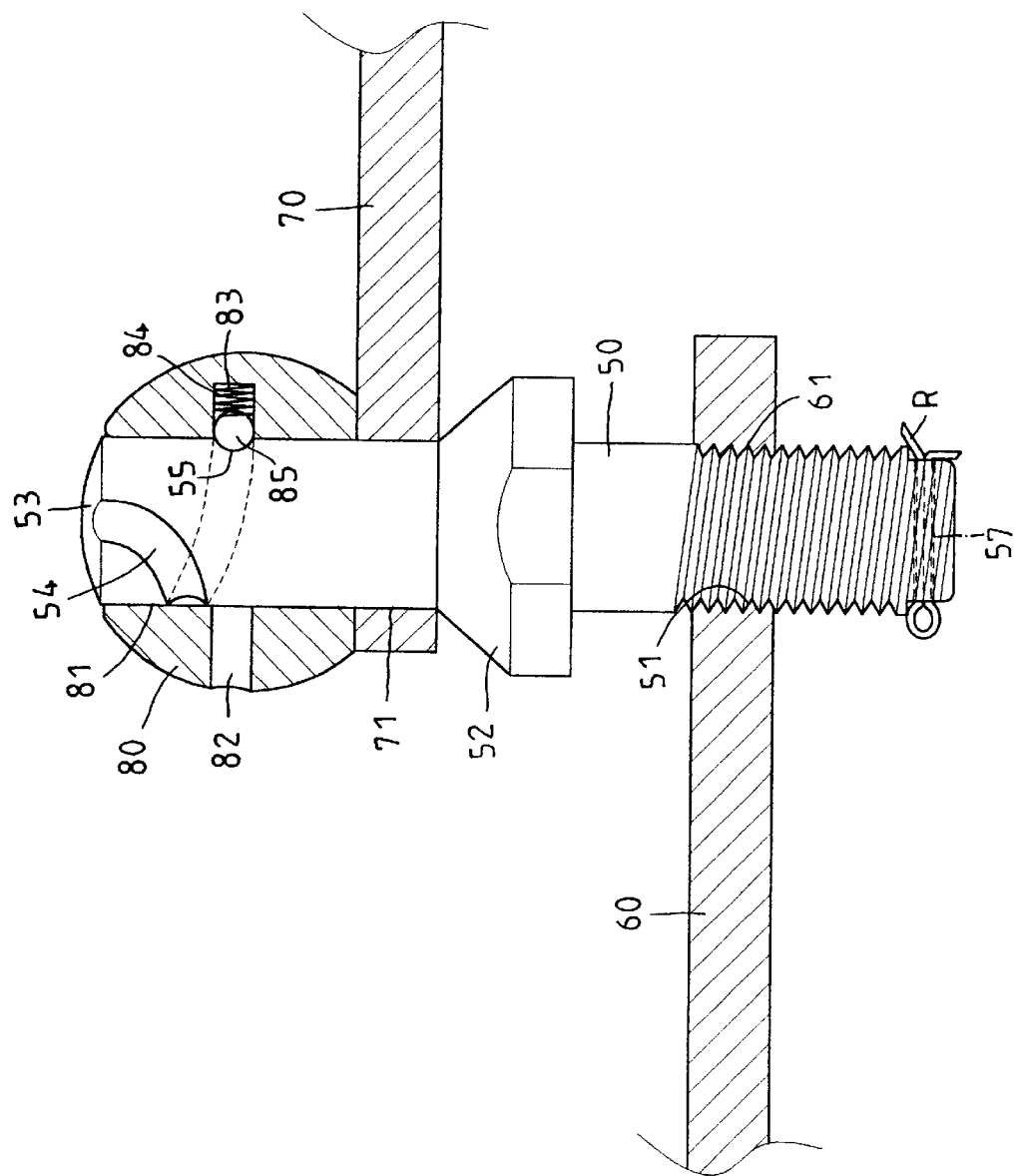
FIG. 2 is a sectional schematic view illustrating a trailer fastening device of a preferred embodiment fastening a first trailer plate and a second trailer plate.
Figure 3:
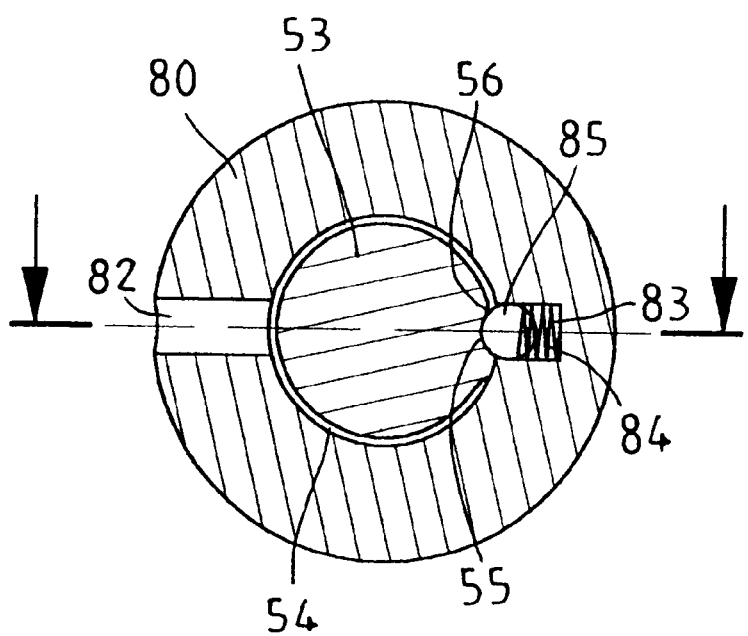
FIG. 3 is a sectional schematic view illustrating a solid ball inserted in a blind hole of an upper rod stably.

Referring to FIGS. 1 to 3, a trailer fastening device comprises a fastening shaft 50, a collar 80, a spring 84, and a solid ball 85.

The collar 80 has a center hole 81, a through hole 82, and an inner recess hole 83 receiving the spring 84 and the solid ball 85.

The fastening shaft 50 has a middle blocking disk 52, a lower threaded rod 51 disposed on a bottom of the middle blocking disk 52, and an upper rod 53 disposed on a top portion of the middle blocking disk 52.

The upper rod 53 has a helical groove 54, a blind hole 55 formed on an end of the helical groove 54, and the end of the helical groove 54 being a bevel 56.

The upper rod 53 is inserted in the center hole 81 of the collar 80.

The collar 80 is rotated until the solid ball 85 reaches the blind hole 55 of the upper rod 53 along the helical groove 54 of the upper rod 53.

Referring to FIG. 2 again, a first trailer plate 60 has a threaded hole 61 and a second trailer plate 70 has a circular hole 71.

The lower threaded rod 51 is inserted through the threaded hole 61 of the first trailer plate 60.

The upper rod 53 is inserted through the circular hole 71 of the second trailer plate 70.

Then the collar 80 is rotated until the solid ball 85 reaches the blind hole 55 of the upper rod 53 along the helical groove 54 of the upper rod 53.

The invention is not limited to the above embodiment but various modification thereof may be made. Further, various changes in form and detail may be made without departing from the scope of the invention.

I claim:

1. A trailer fastening device comprises:

a fastening shaft, a collar, a spring, and a solid ball, the collar having a center hole, a through hole, and an inner recess hole receiving the spring and the solid ball, the fastening shaft having a middle blocking disk, a lower threaded rod disposed on a bottom of the middle blocking disk, and an upper rod disposed on a top portion of the middle blocking disk, the upper rod having a helical groove, a blind hole formed on an end of the helical groove, and the end of the helical groove being a bevel, the upper rod inserted in the center hole of the collar, and the collar being rotated until the solid ball reaches the blind hole of the upper rod along the helical groove of the upper rod.

* * * * *